United States Patent Office 3,488,672
Patented Jan. 6, 1970

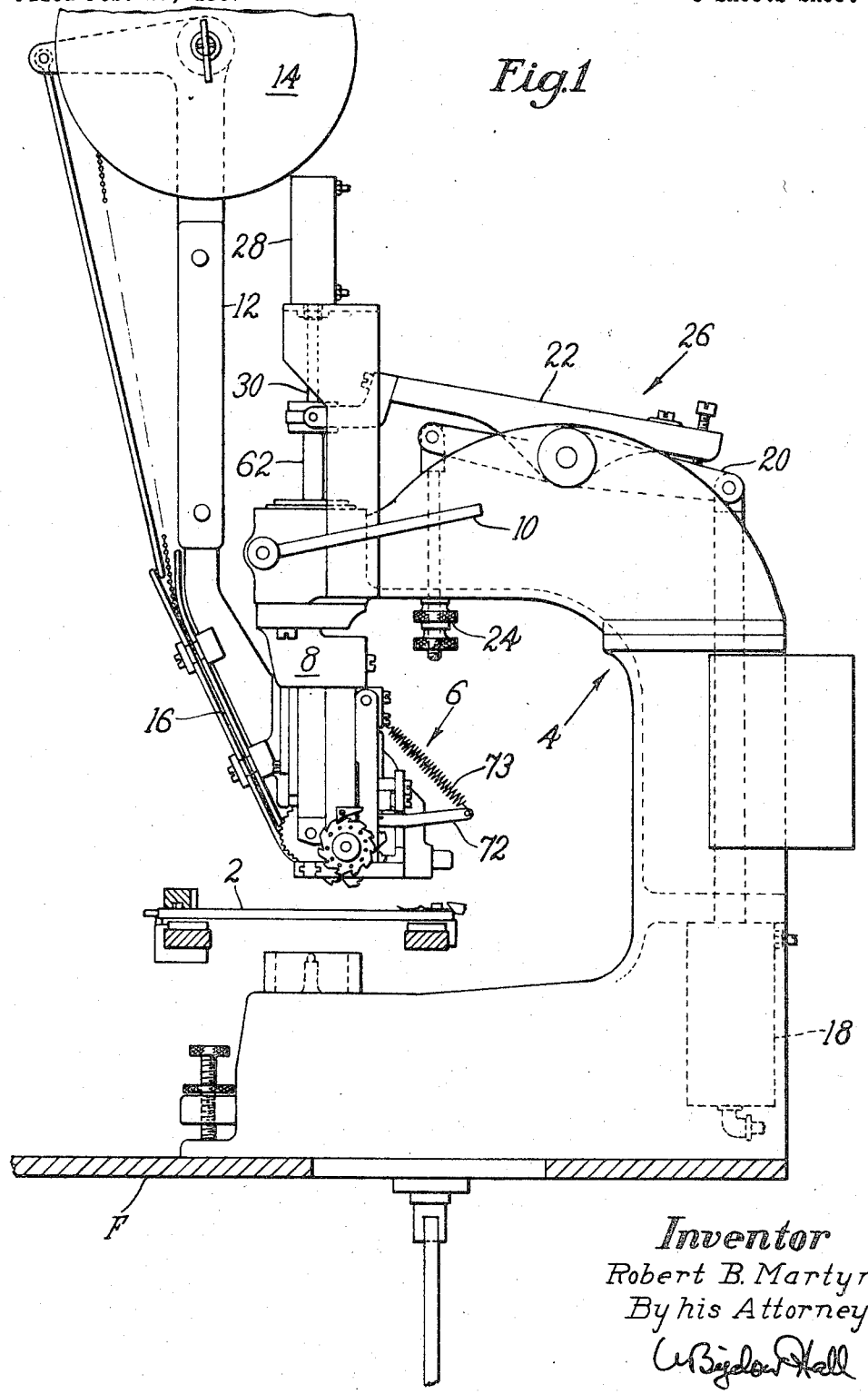

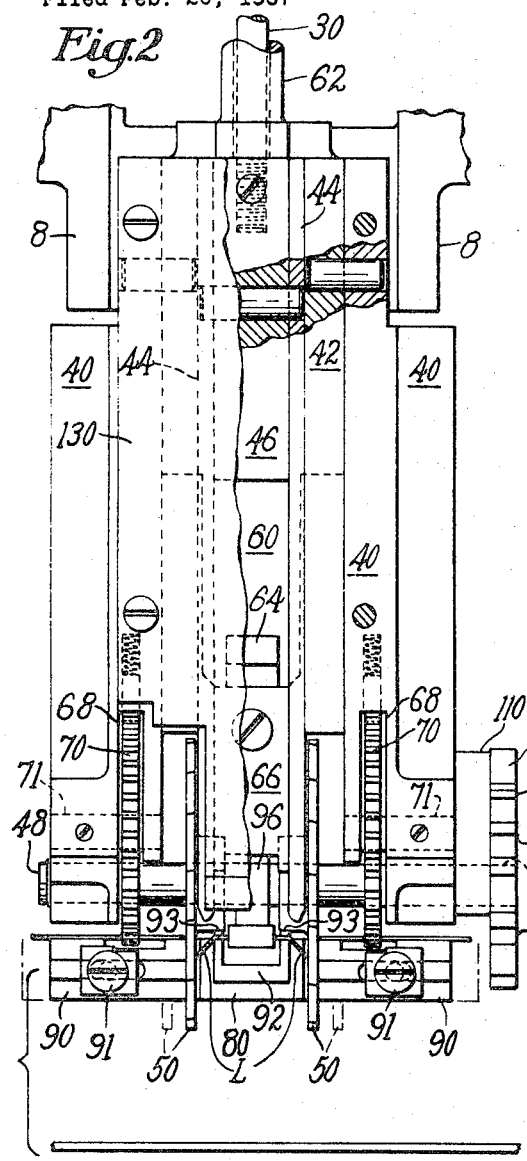
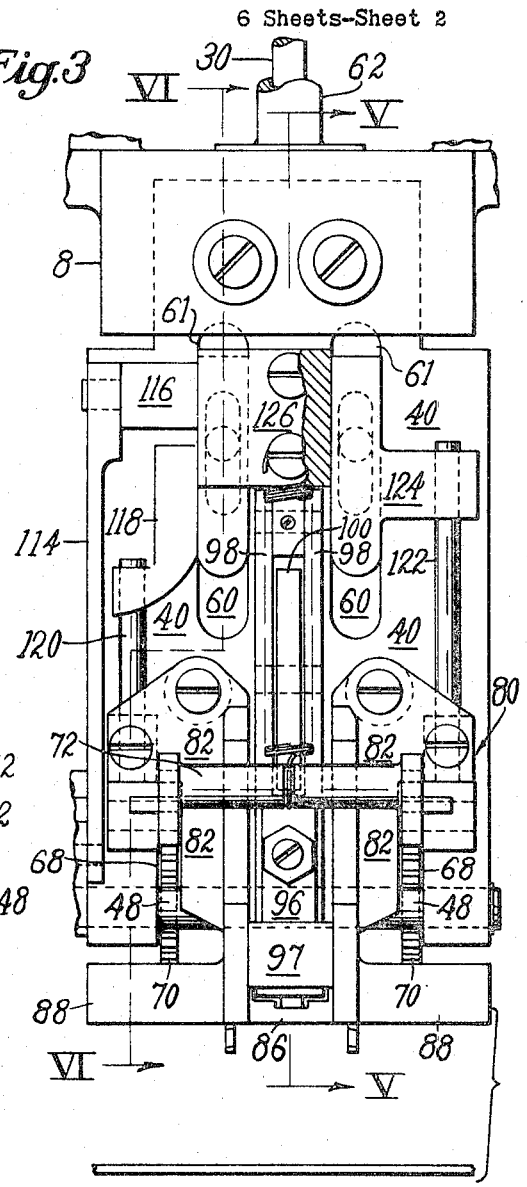

3,488,672
MECHANISM FOR CUTTING, FORMING
AND INSERTING COMPONENTS
Robert B. Martyn, Danvers, Mass., assignor to USM Corporation, Flemington, N.J., a corporation of New Jersey
Filed Feb. 20, 1967, Ser. No. 617,310
Int. Cl. H05k 3/30
U.S. Cl. 29—626     8 Claims

ABSTRACT OF THE DISCLOSURE

A mechanism for cutting, forming and inserting the leads of a component, including axially adjustable multi-surfaced rotatable cutters which are activated upon the return stroke of inserting means thereby cutting the leads to proper length, thus preparing the component for forming and inserting during the operative stroke of the same inserting means.

Background of the invention

This invention relates to the field of automatic component handling and in particular to the cutting, forming and insertion of the leads or projections of these components which are continuously supplied to the mechanism from a suitable source.

Description of prior art

It is known in the art to automatically cut to length, form and insert leads of components, e.g., U.S. Patent 2,791,772 granted on May 14, 1957 to Cardani et al. and U.S. Patent 2,896,213 granted on July 28, 1959 to Alderman et al. A single edge cutting tool is used to shear each of a pair of leads to proper length. This pair of cutting tools, designed for vertical reciprocation, is difficult or impossible to adjust laterally for varying the lengths of the leads cut. Because of the limited cutting surface on the tools, frequent resurfacing is necessary to assure consistent operation.

Summary of the invention

It is an object of this invention to minimize the need for sharpening the cutting tools and to provide in a component mounting machine improved means to accomplish easy adjustment of the cut lengths of the component leads a pair of multi-surfaced adjustably mounted rotatable cutters has been provided to this end, and in accordance with a feature of the invention, the rotatable cutters provide a series of sequentially used edges, thereby eliminating the need for frequent machine shutdown for re-surfacing of the cutter surfaces.

Since the cutters are mounted for rotation, adjustment with respect to the length of lead may be made by simply moving the cutters on their axes, with a corresponding adjustment of the associated shear blocks.

As an additional feature of this invention the entire cycle of indexing, cutting, forming and inserting the leads of components is of shorter duration than required by the patented construction hitherto disclosed since index sprockets and the rotatable cutters are now sequenced to operate during the previously ineffective return stroke of the formers and driver. The rotary cutters advantageously shear the leads in the machine cycle preceding their forming and insertion.

The above and other features of the invention including various novel details of construction and combinations of parts will now be more particularly described with reference to the accompanying drawings and pointed out in the claims.

Brief description of the drawings

FIG. 1 is a side elevation showing the complete component inserting machine including the improved inserting mechanism;

FIG. 2 is a front elevation of the improved inserting mechanism with the housing cover partly broken away to show the interior mechanism;

FIG. 3 is a rear elevation view of the inserting mechanism of FIG. 2;

Description of the preferred embodiments

Figure 4:
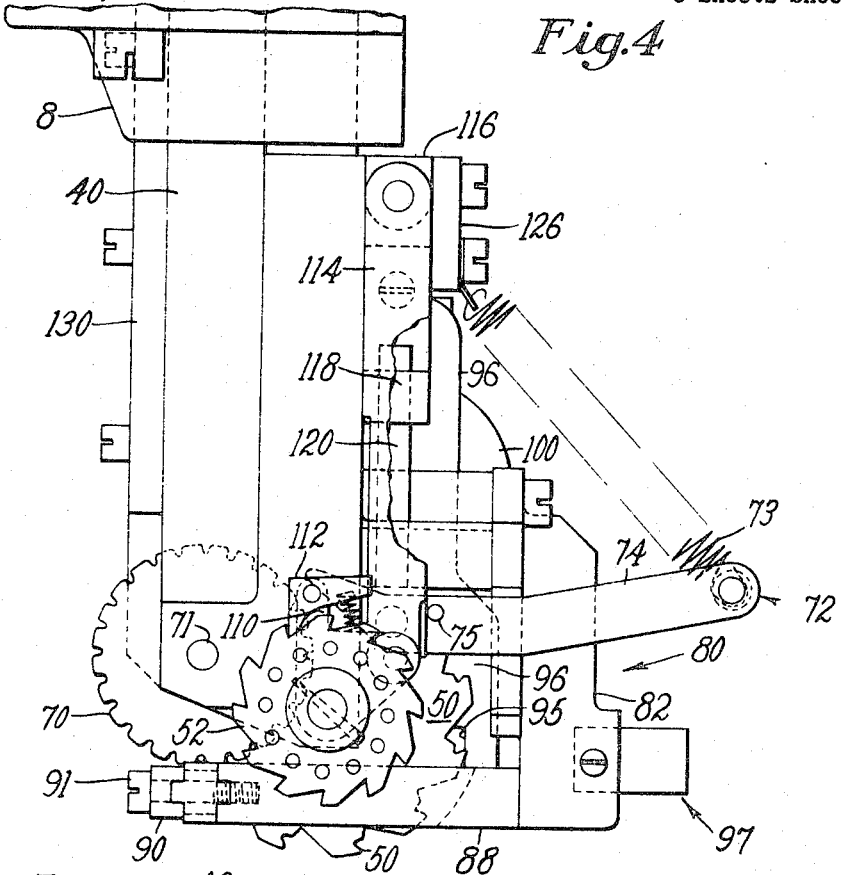
FIG. 4 is a side elevation of the inserting mechanism of FIG. 1.

Seen in FIG. 1 is an illustrative machine which embodies the inventive concepts. The machine is adaptable for either manual control or, as shown, to be adjustably positioned at one of the operating stations of an automatic assembly line. In either case appropriate means is provided for supporting a wiring board 2 (FIG. 1) in a predetermined position relative to the operating instrumentalities later to be described. The position is critical to ensure that components may be formed and applied with their leads L extending through pre-formed holes in the wiring board for suitable connection with the circuitry thereon. For a more detailed description of the mechanism shown supporting the wiring board 2, the reader is referred to the patent to Alderman et al. noted above.

In order to locate the component inserting instrumentalities of the illustrated machine for an accurate register with the appropriate pre-formed holes in the presented board 2 and in order to assure convenient flexibility of operation on variable wiring board circuitry, a hollow C-frame 4 is arranged to be clamped in a relatively unlimited number of positions above an opening in the conveyor frame F by any suitable means. The C-frame 4 has located at its uppermost and overhanging end, means for adjustably supporting a component inserting head 6 which generally comprises a supporting bracket 8 extending through the bifurcated end of the C-frame 4 and attached to the inserting head 6 in a manner allowing vertical adjustment of the inserting head.

Confronting checks of the bifurcated end of the frame are provided with aligned bores having a clamping bolt threaded therein operated by a hand lever 10 enabling the component applying head 6 to be independently angularly adjustable. Mounted above the C-frame 4 for ease in feeding of the components to the inserting head 6 is a bracket 12 which supports a reel of belt components 14 for feeding down a guiding raceway 16 to the inserting head.

The means for motivating the various operations of the illustrative mechanism comprises a pair of pneumatic cylinders. A large relatively powerful cylinder 18 is mounted within the C-frame 4 and acts through levers 20, 22 to index and cut the component. It is to be noted that the pair of levers 20 and 22 include a stop member 24 restraining downward motion of the piston (not shown) and a pair of opposing screws 26 for minute adjustment in the length of the stroke. A small cylinder 28 is mounted directly above the inserting head and exerts its pressure directly through a linking rod 30 to the mechanism for forming and guiding the pre-cut component.

The component inserting head (FIGS. 2, 3, 4, and 8) comprises a channel shaped housing 40 which provides the main support for the entire inserting mechanism. Fixedly mounted on the inside of the channel adjacent to the inner surface of the legs of the channel is a pair of filler pieces 42. A pair of outside formers 44, designed to properly shape the component leads L for insertion into a circuit board, is slideably mounted adjacent to the inner surfaces of the filler pieces 42 and mounted between the formers is a spacer block 46. The outside formers 44 and the spacer block 46 are designed to be moved as a unit locked together by pins, and driven by the rod 30 connected to the piston in the smaller cylinder 28.

The lower portion of the housing 40 has a shaft 48 passing through and extending between the two sides of the housing. Mounted upon the shaft 48 for axial adjustment is a pair of rotatable cutter wheels 50 which are mounted outside the lower portion of the outside formers 44. It is to be noted that the adjustment of each of the cutter wheels is independent, allowing a different length of cut on each side. Also mounted on the shaft 48 outside the housing 40 is a ratchet wheel 52 through which the shaft and the cutter wheels 50 are driven.

Mounted behind the outside formers 44 and their associated spacer 46 within the housing 40 is a driver slide 60 which is rigidly connected to a sleeve 62 which surrounds the rod 30 and with swivel trunnions is connected to the lever 22 described above. The lower portion of the driver slide 60 has a forwardly projecting inverse L shaped member which has its outwardly projecting portion extending forwardly beneath the spacer 46 and providing horizontal support for the driver slide 60 by abutting the housing cover 130 and total support for the driver end 66.

Mounted within vertically extending slots in the housing 40 is a pair of feed sprockets 70 to receive an individual component from the raceway 16 and place it in proper position on the anvil to be cut. The feed sprockets 70 lie outside, slightly above and forward of the rotatable cutter wheels 50. The feed sprockets are mounted upon shafts 71 for rotation and are driven by a twin armed feed pawl 72 mounted to the rear of the housing 40 (see FIGS. 3 and 4). Feed pawl 72 is pivotally mounted between the lower ends of rods 120, 122 and has its outer end supported by a spring 73.

Mounted on the outer surface of each of the arms 74 is a stop pin 75 which by coaction with the rods 120, 122 balances the upward force of spring 73 and maintains the pawl 72 in proper working position.

Figure 8:
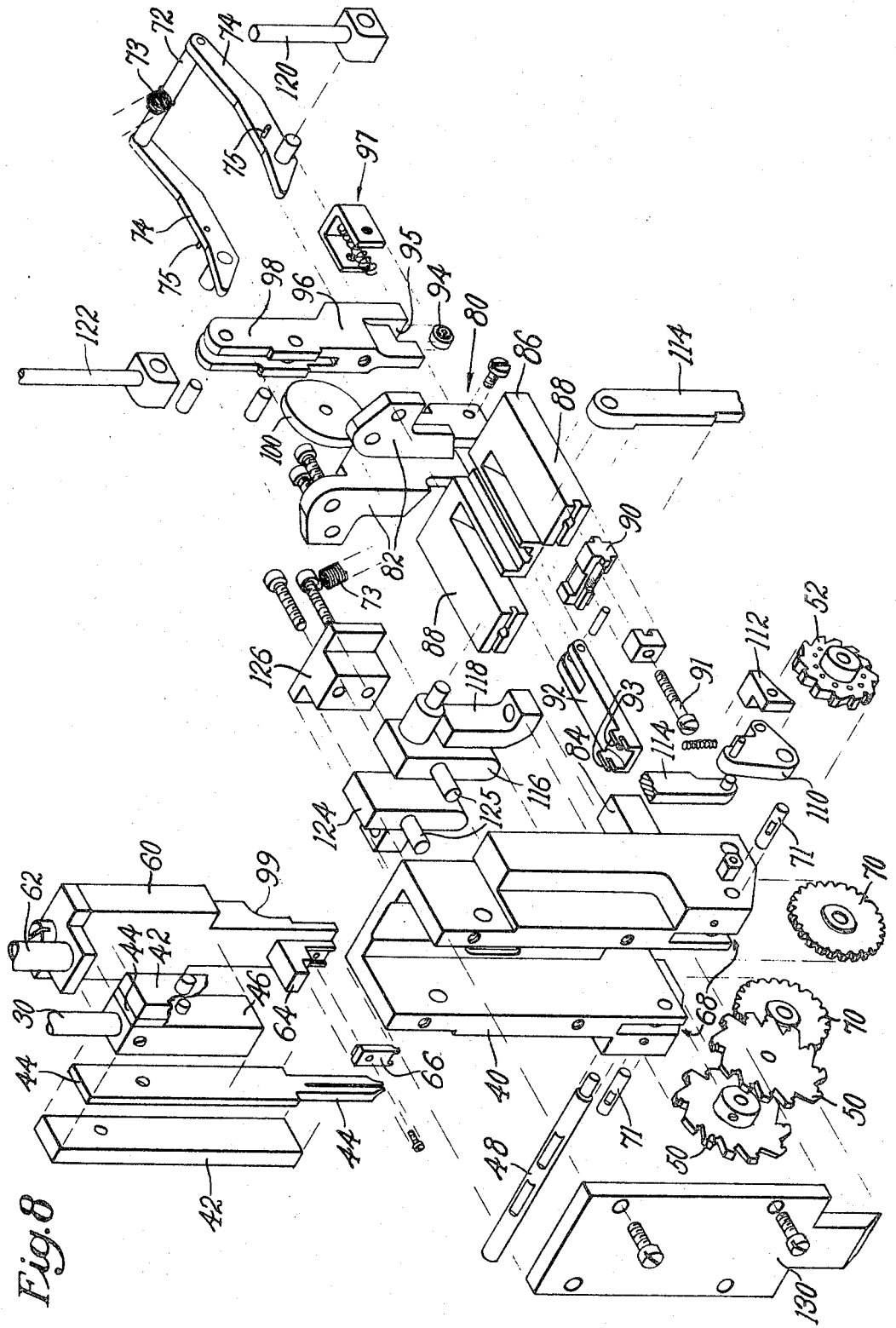
FIG. 8 is an exploded view of the inserting mechanism of FIG. 2.

Rigidly attached to the rear and extending below the housing 40 is a shear block bracket 80 which is of an L-shaped side view and an E shaped top view (see FIGS. 3, 4, and 8). Upwardly extending portions 82 of the bracket are rigidly attached to rearwardly extending blocks 84 to the housing 40 (see FIGS. 6 and 8). A laterally extending portion 86 of shear block bracket 80 which is generally E shaped extends forwardly beneath the housing 40 and has mounted on the outermost ends of the outer legs 88 a pair of adjustably mounted shear blocks 90. The shear blocks 90 are individually laterally adjustable to accommodate the cutter wheels by simply loosening screws 91. Slideably mounted for horizontal reciprocation in the center leg of the E shaped portion 86 of shear block bracket 80 is an inside former 92 which has a bifurcated rear portion and a pair of upwardly extending finger portions 93 at its forward end, which confine the component leads during cutting and forming.

Figure 5:
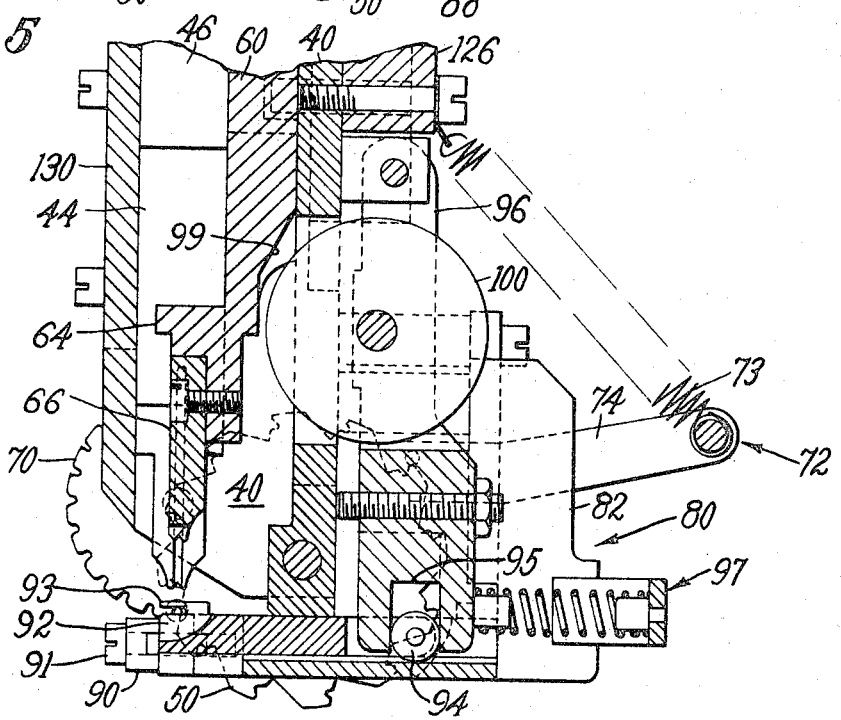
FIG. 5 is a sectional view along the line V—V of FIG. 3.

Mounted within the bifurcated rear portion of inside former 92 is a roller 94 (see FIGS. 5, 7, and 8) which is confined within a recess 95 of a lever 96 having an upwardly extending bifurcated portion 98 pivotally mounted at its uppermost end to the housing 40. Rotatably mounted between the two portions of the bifurcated upper end 98 is a cam roll 100 extends beneath the recessed rear portion of driver slide 60 (see FIGS. 5 and 6).

To urge lever 96 to its forwardmost position when not forced rearwardly by coaction of cam roll 100 and driver slide 60 there is mounted rearwardly of the lever 96 a compression spring and supporting bracket generally designated 97. The bracket is rigidly attached to the rear portion of the shear block bracket 80 and holds the spring in constant contact with the lever 96.

Figure 6:
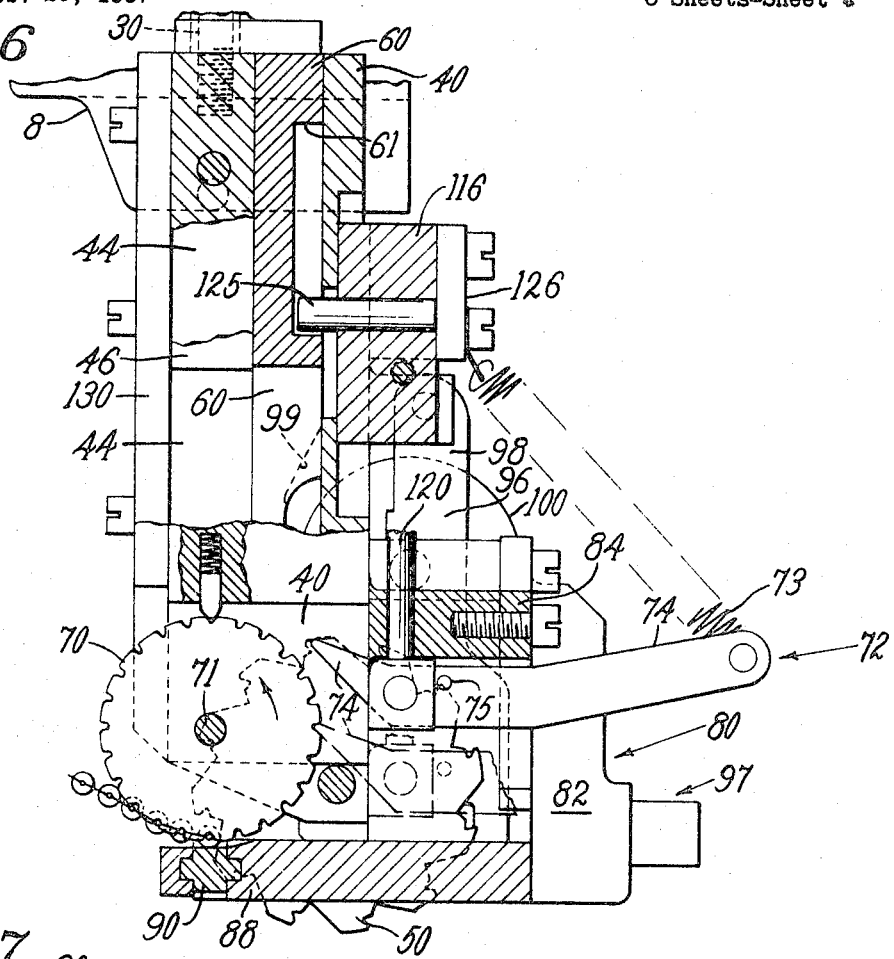
FIG. 6 is a sectional view along the line VI—VI of FIG. 3.
Figure 7:
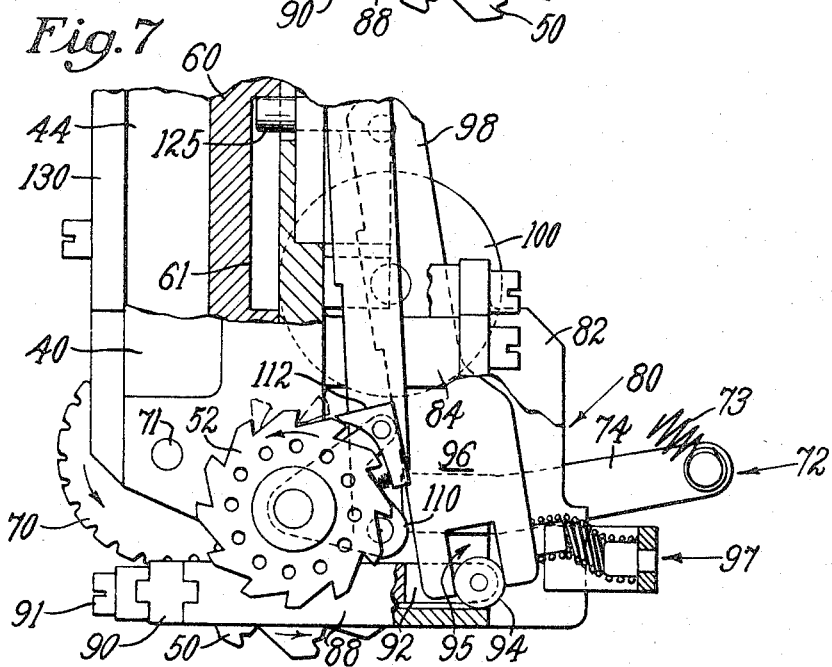
FIG. 7 is a partial elevation of the inserting mechanism with the driving mechanism in its lower position, partially broken away the clarity.

Mounted for pivotal movement upon the shaft 48 is a triangularly shaped bell crank 110 which in turn has pivotally mounted thereon a ratchet pawl 112 for engagement with the ratchet wheel 52. The bell crank 110 is pivotally connected to one end of a link 114, the other end being pivoted to a vertically movable slide 116, which in turn is mounted for vertical reciprocation and has an outwardly extending pin 125 passing through the housing 40 and extending into an elongated receiving groove 61 in the driver slide 60 (FIGS. 6 and 7).

Mounted at the lower end of the slide 116 and extending laterally therefrom is a rod receiving bracket 118 which is rigidly fastened to a rod 120 having its lower end pivotally connected to one side of the twin armed feed pawl 72. The opposite arm of the twin armed feed pawl is likewise connected to a vertically extending rod 122 which is rigidly fastened to a slide 124 which has a pin 125 extending through the housing 40 into the driver slide 60 similarly to the slide 116. A T-shaped cap member 126 is rigidly mounted on the housing 40 with the lower surface of the broad leg abutting the rear face of the housing 40 and the wings extending outwardly overlapping the slides 116, 124, retaining them in slideable contact with the driver slide 60.

Rigidly mounted upon the front of the housing 40 is a housing cover 130 which closes the space between the legs of housing 40 and assure proper contact and coaction of all the elements within the housing 40.

Operation

The component about to be inserted has its leads cut to proper length before they are formed and inserted, therefore when beginning operation with the illustrative machine it may be necessary to cycle once before actual insertion. On the downward stroke of the first cycle there may be no previously indexed component to insert and therefore the motion is only to index and cut the first component.

Figure 10:
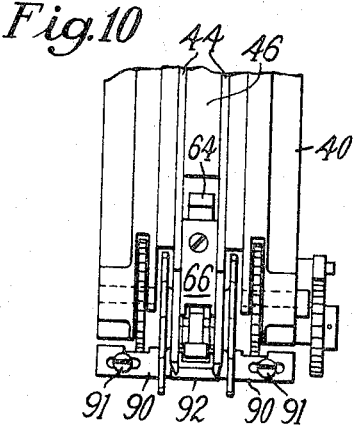
Figure 11:
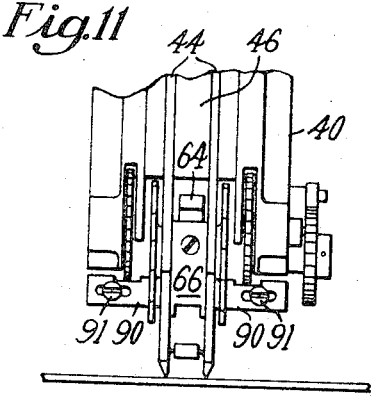
Figure 12:
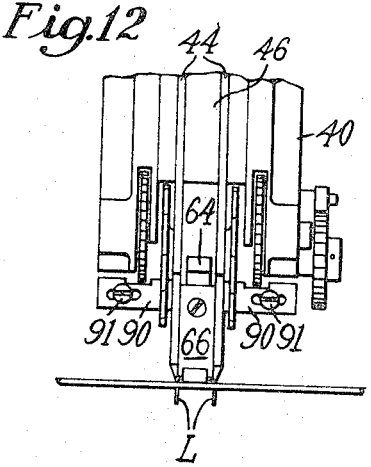
Figure 13:
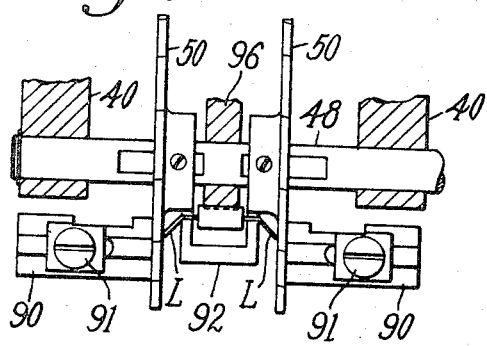
FIGS. 13 and 14 show the rotatable cutters in two of their possible positions.
Figure 14:
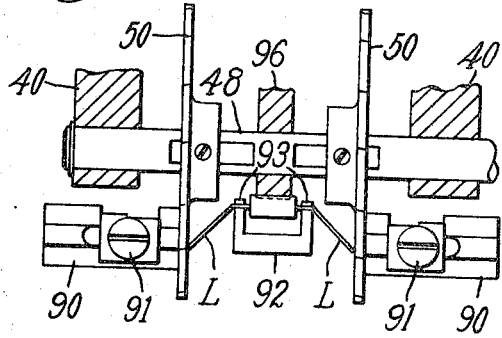

In particular, the operating stroke (insertion on all but the first cycle) comprises the action of the cylinder 28 acting through the rod 30 which forces the outside formers 44 and the spacer block 46 downwardly until the block abuts the upper surface of the projection 64 of the driver slide 60. During this motion, the leads of the component are formed (see FIG. 10). The cylinder 18 acting through the sleeves 62 now forces the driver slide 60 to move downwardly, allowing the formers 44 to continue their downward motion. This motion carries the component, held and guided by the outside formers, down to the board, FIG. 11. The cylinder 28 has now reached the end of its stroke and the outside formers remain stationary while the driver slide 60 with the attached driver end 66 force the component through the circuit board 2, FIG. 12. The lead ends are now clinched by any desired means known in the art. The pistons return but it is to be noted that the outside formers 44 return more rapidly, since cylinder 28 is smaller, until the upper surface of the spacer block 46 contacts the lower surface of the anchor for the sleeve 62.

Figure 9:
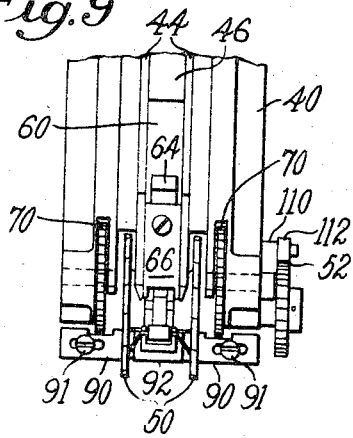
FIGS. 9 through 12 sequentially show the inserting head in operation.

The difference in the rate of return assures that the next component can be indexed and cut since the outside formers are certain to be out of the way. When the piston in this cylinder 28 is again in the uppermost position, and the piston in the cylinder 18 is in its lowermost position, another component has been indexed and cut as described below and the mechanism is ready to cycle again, FIG. 9.

It is to be noted that the inside former 92 must necessarily be located between the outside formers 44 during the forming operation which would place it directly in the path of the driver slide 60 and the driver end 66 during the downward stroke. This apparent interference between the parts is prevented by the coaction of the driver slide 60, the cam roll 100, the lever 98, and the roller 94. On the rear surface of the driver slide is a cam surface 99 for the cam roll 100 mounted on the lever 98. Downward motion of the driver slide 60 forces the cam roll 100 rearwardly carrying the lever 98 and the roller 94 at its lowermost end toward the rear of the machine. Since the roller 94 is mounted on the inside former 92, the rearward motion moves the inside former 92 from the path of the driver. The inside former is returned to its forming position upon the upward movement of the driver slide 60 by the action of the compression spring 97.

The indexing and cutting operations occur upon the return stroke of the inserting mechanism. The feed sprockets 70 must index the component into proper position on the shear blocks 90 before the rotary cutters are indexed. When the driver slide 60 goes all the way down it carries the feed sprocket slide 124 and the bell crank link slide 116 all the way down to the end of their stroke. This enables the two ends of the twin armed feed pawl 72 to engage a new tooth space in each feed sprocket 70. These two pawls are now ready to index the next component into position. At the same time the cutter ratchet pawl 112 has been rotated backwards by means of the link 114 and the bell crank 110. This backward rotation includes a fair degree of overtravel as shown in FIG. 7.

When the driver slide 60 begins its return or upward stroke nothing happens until the bottom of the driver end 66 is adjacent to the top of the pair of shear blocks 90. This delay is caused by the extended length of the slide receiving slots in the rear of the driver slide 60. At this position the lower ends of the slots in the rear of driver slide 60 are in contact with the pins of the feed sprocket slide 124 and the bell crank link slide 116, and further motion will cause the slides to move upwardly. The upward motion immediately causes the end of the twin armed feed sprocket pawl to move upwardly, rotating the feed sprockets 70 and indexing a new component into position.

Note that the cutter ratchet pawl 112 is also moving forward at this time but is doing no work because of the overtravel mentioned above. The driver slide 60 continues to move upwardly and the ends of the twin armed feed sprocket pawl 72 will leave the feed sprockets 70 (see FIG. 6). The cutter ratchet pawl 112 is now engaging the ratchet wheel 52, causing the cutters to rotate at least one tooth a sufficient distance to cut the component's leads to length and move the cutters to a position wherein an open space is available to receive the next component. The driver slide is now all the way up and the cycle is completed.

It will be understood that the particular machine embodying the invention is shown by way of illustration only and not as a limitation of the invention. The principles and features of this invention may be employed in varied and numerous embodiments without departing from the scope of the invention.

Having thus described my invention, what I claim as new and desire to secure by Letters Patent of the United States is:

1. In a machine for cutting, forming and inserting component leads into boards wherein the component whose leads are to be cut and inserted is automatically delivered by feed mechanism to the machine, the central portion of the component is supported by an inside former, the leads of the component are cut to a predetermined length, the leads are shaped around the outside of the inside former by outside formers moving relative to the inside former and then the component is driven into position by a driver bar having operative and return strokes; a pair of rotary cutters having a plurality of sequentially operative cutting surfaces for cutting the leads of successive components, and means operating the rotary cutters, feed mechanism, and the driver bar so that a component is indexed into position and its leads are cut during the return stroke of the driver bar to prepare the component for insertion upon the subsequent operating stroke of the driver bar.

2. A machine as in claim 1 wherein the rotary cutters are axially adjustable.

3. A machine as in claim 1 wherein the rotary cutters are independently adjustable along their axes.

4. The method of placing a component in a board comprising the following steps:
 (a) on the operative stroke of an inserter
  (1) forming the leads of the component;
  (2) guiding the component to the board;
  (3) driving the component leads through the board;
  (4) fastening the component in place; and
 (b) on the return stroke of the inserter
  (1) indexing a component onto a shear block,
  (2) rotatably cutting the leads to proper length.

5. A machine for automatically placing a component in a board comprising:
 (a) indexing means for automatically transferring successive lead-bearing components from a supply to a position whereat the leads are adjacent shear blocks mounted adjacent the transfer means,
 (b) rotary cutting means respectively having a plurality of successively operable cutting surfaces each of said rotary cutting means cooperating with a shear block to sever a lead of each indexed component to a predetermined length,
 (c) reciprocable forming means to shape the leads of the component following the cutting operation and to guide the leads to the appropriate position above the board,
 (d) reciprocable driving means mounted adjacent the forming means to force the component leads when formed through the board, and
 (e) mechanism responsive to retraction of the driving means from the board for sequentially causing the indexing and rotary cutting means to operate on the next component to be formed and driven.

6. A machine as in claim 5 wherein the forming means comprises a first reciprocable means for holding the component during the cutting and forming steps and serving as a form during the forming, and second reciprocable means movable in a plane substantially parallel to the movement of the first reciprocable means to conform the shape of the leads to the shape of the first reciprocable means.

7. A machine as in claim 5 wherein the rotary cutters respectively comprise a disc like body having a plurality of discrete radial cutting surfaces, each cutting surface being formed with a lead engaging V-shaped notch.

8. A machine as in claim 5 wherein each cutter and its associated shear block are adjustable along the axis of the cutter.

References Cited

UNITED STATES PATENTS

| | | | |
|---|---|---|---|
| 2,978,707 | 4/1961 | Runciman | 29—203 |
| 2,848,718 | 8/1958 | Hancock | 227—90 |
| 3,167,780 | 2/1965 | Mueller | 227—90 X |
| 3,187,972 | 6/1965 | Shann | 227—90 |

THERON E. CONDON, Primary Examiner

E. F. DESMOND, Assistant Examiner

U.S. Cl. X.R.

29—203; 227—88